United States Patent [19]

Shipp et al.

[11] Patent Number: 5,264,925
[45] Date of Patent: Nov. 23, 1993

[54] SINGLE SENSOR VIDEO IMAGING SYSTEM AND METHOD USING SEQUENTIAL COLOR OBJECT ILLUMINATION

[75] Inventors: John I. Shipp, Tullahoma, Tenn.; John L. Goodell, Sunnyvale, Calif.

[73] Assignee: Life Surgery, Inc., Tullahoma, Tenn.

[21] Appl. No.: 905,278

[22] Filed: Jun. 26, 1992

[51] Int. Cl.$^5$ .............................................. H04N 9/07
[52] U.S. Cl. ........................................ 358/44; 358/41; 358/43
[58] Field of Search ............... 358/41, 43, 44, 909, 358/75

[56] References Cited

U.S. PATENT DOCUMENTS

| 4,074,306 | 2/1978 | Kakinuma | 358/98 |
| 4,253,447 | 3/1981 | Moore et al. | 128/6 |
| 4,967,264 | 10/1990 | Parulski | 358/44 |

FOREIGN PATENT DOCUMENTS 63-227293  9/1988  Japan.

*Primary Examiner*—James J. Groody
*Assistant Examiner*—Sherrie Hsia
*Attorney, Agent, or Firm*—Mark J. Patterson; Edward D. Lanquist, Jr.; I. C. Waddey, Jr.

[57] ABSTRACT

A color video processing method in which three primary color signals are obtained sequentially from a single monochrome photo sensor array. RGB signals are obtained by twice delaying the output of the sensor by non-color specific delays equal to a standard field period, and matrix switching the sequential RGB signals to their respective outputs.

7 Claims, 6 Drawing Sheets

SINGLE SENSOR VIDEO IMAGING SYSTEM AND METHOD USING SEQUENTIAL COLOR OBJECT ILLUMINATION

BACKGROUND OF THE INVENTION

The present invention relates to a method and apparatus used for processing color images from a sequentially illuminated object to form high resolution color video signals suitable for use in viewing the object on a television monitor.

It will be appreciated by those skilled in the art that the use of charge coupled devices (CCD) as sensors in video imaging systems has become quite popular, as, for example, where small size and low power consumption is desired. In the processing of color video images, it is preferred for a number of reasons that a single CCD sensor be used. To that end, several methods have been developed in the prior art, one class of which requires sequential illumination of the object to be viewed, and subsequent processing of signals from the sensor which represent the level of reflected light corresponding to each of three primary colors.

Prior art sequential illumination and processing methods, however, are deficient in either the level of resolution obtainable, in their need for a higher rate of sampling of data from the sensor, or in their relative sensitivity. For example, in U.S. Pat. No. 4,253,447 is disclosed a sequential illumination process which requires reading out of only half the field lines (corresponding to either the even or the odd fields), resulting in a 50% reduction in vertical resolution. The '447 patent also discloses a second method whereby the object is sequentially illuminated by all three primary colors during each of the odd and even field periods. Unfortunately, this method requires that the CCD data be read at three times the standard speed which is not always possible. In addition, this technique requires six field memories and for a given signal-to-noise ratio, it is less sensitive than the current invention by a factor of three.

Prior art light sources used in conjunction with a sequential color video camera include: sequentially lighting the object field with each primary color by rotating a three-color segmented filter in the path of a white light source; sequentially illuminating the object with a plurality of solid state light emitting chips mounted in a single transparent package, as disclosed in U.S. Pat. No. 4,074,306; or sequentially illuminating the object with three white strobe lights with a different primary color filter in each of the strobe light paths, as shown in U.S. Pat. No. 4,253,447. All of these methods are troublesome.

In some instances it is difficult or inconvenient to cable video information to a monitor, yet it is desirable to transmit color video data to a remote site for display and analysis. It is also in many cases desirable to minimize the amount of circuitry at the sensor site for applications such as minimum invasion (laparoscopic) surgery, drill hole inspections, and the like.

What is needed, then, is an apparatus for sequentially illuminating an object and processing color images therefrom, using a single sensor and a minimum of memory devices, and a flicker-free method of processing video signals from the sensor without degradation of spatial resolution or sensitivity, and without the need for accelerated sampling rates. Preferably, this apparatus should also be adaptable to applications which would benefit from remote transmission of video data.

SUMMARY OF THE INVENTION

An object of the present invention is to eliminate flicker in a simplified sequential color video system while maintaining good spatial and temporal resolution.

A further object is to provide for a simplified sequential light source which uses standard, single-chip mounted light emitting diodes in three primary colors, red, green, and blue, the outputs of which are synchronized wit the standard field period of a CCD.

To achieve the objective of elimination of flicker, according to the invention, video data from a color sequentially exposed CCD is delayed for up to two field periods in a non-color specific pipeline memory, while exposure continues for the remaining primary colors at the television field rate. Using a switching matrix, each of the primary color signals is tapped from the memory pipeline and routed to three outputs, one for each primary color. This, each primary color exposure is displayed for three field periods before temporal updating.

In one embodiment of the device, at least one each of standard, single chip, red, green, and blue light emitting diodes are used for the illumination source. The diodes are also sequentially turned on in synchronization with the field period.

The present invention also lends itself to an embodiment which provides for simple wireless transmission to a remote site, in that the use of single-chip light sources integral to the video sensor head of the device eliminates the need for fiber optic or other cables connected to an external light source.

DETAILED DESCRIPTION OF THE PREFERRED EMBODIMENT

Figure 1:
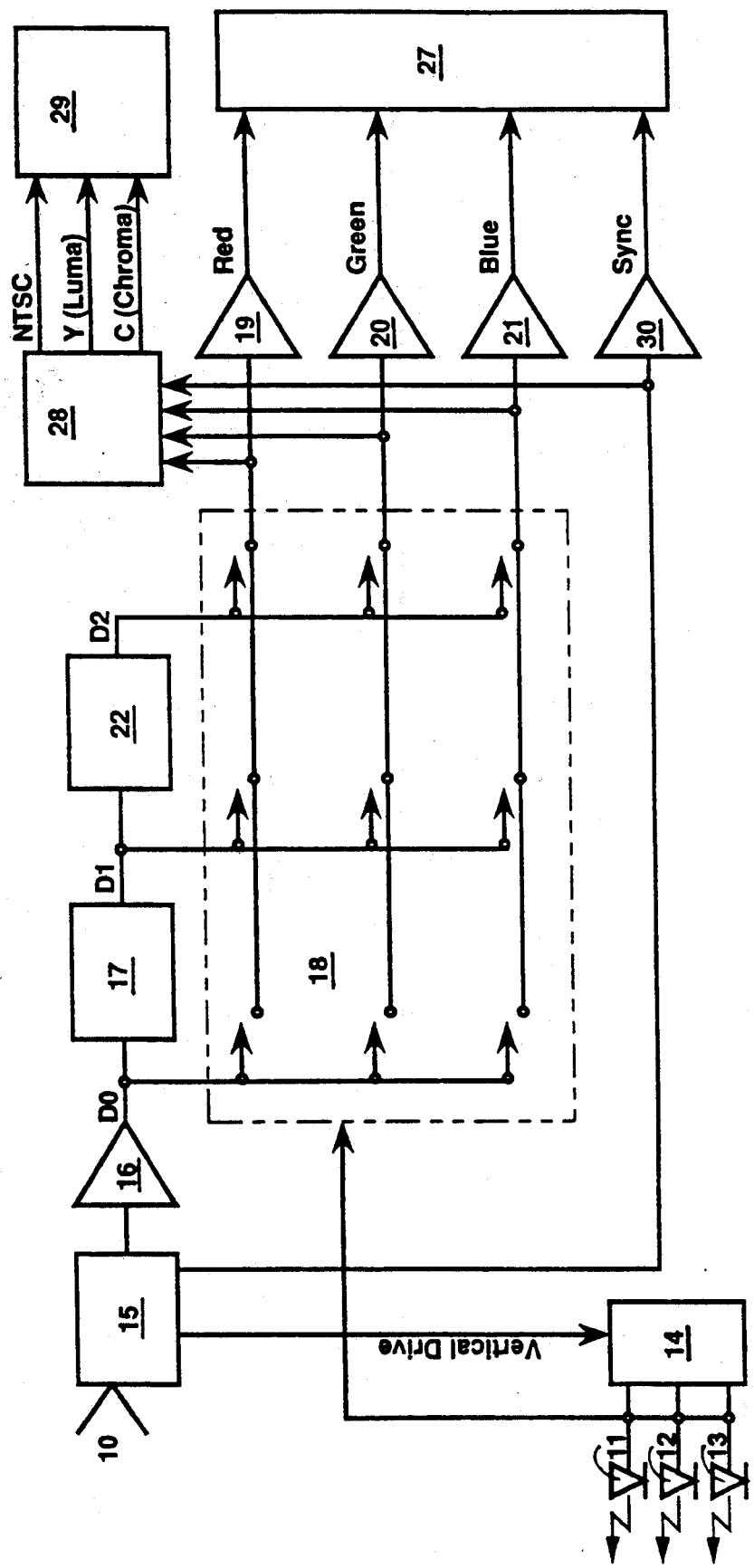
FIG. 1 is a block diagram of a first embodiment of the sequential color video processing apparatus of the present invention, in which the light source, sensor, and processing section are in one unit.

Referring to FIG. 1, there is shown by block diagram representation a first embodiment of the apparatus of the present invention, as well as the basic method by which an object to be viewed is illuminated and color video image data is processed. The method begins by illuminating an object (not shown) with light from a first primary color light source 11, a red light emitting diode (LED) for example, for a period of time typically equal to a standard television field period. Conventionally, this period is 1/60 second. The red first primary light source 11 is activated for this field period by one of three outputs from the divide by three ring counter 14, which has been selected by the vertical drive signal of the sensor 15, preferably a conventional charge coupled device (CCD) assembly, such as the model CCB/M27 from Sony Corporation of America. However, any appropriate photo sensor array can be used. The light reflected from the object is focused onto sensor 15 by a lens system 10, also of conventional design.

Figure 6:
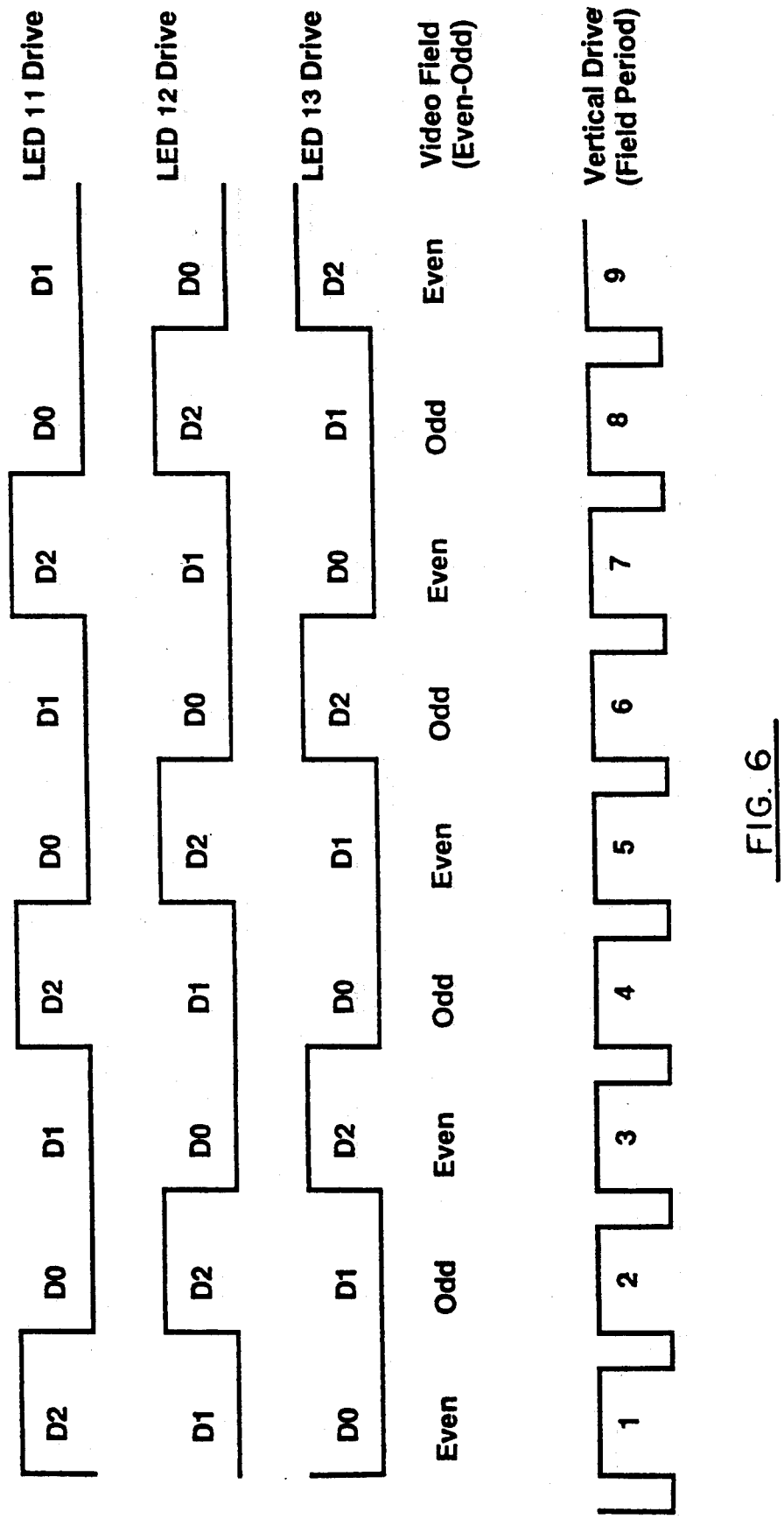
FIG. 6 is a diagram showing the timing relationship among the respective LED driving signals, standard television video field periods, and output signals from the A/D and delay units.
Figure 3:
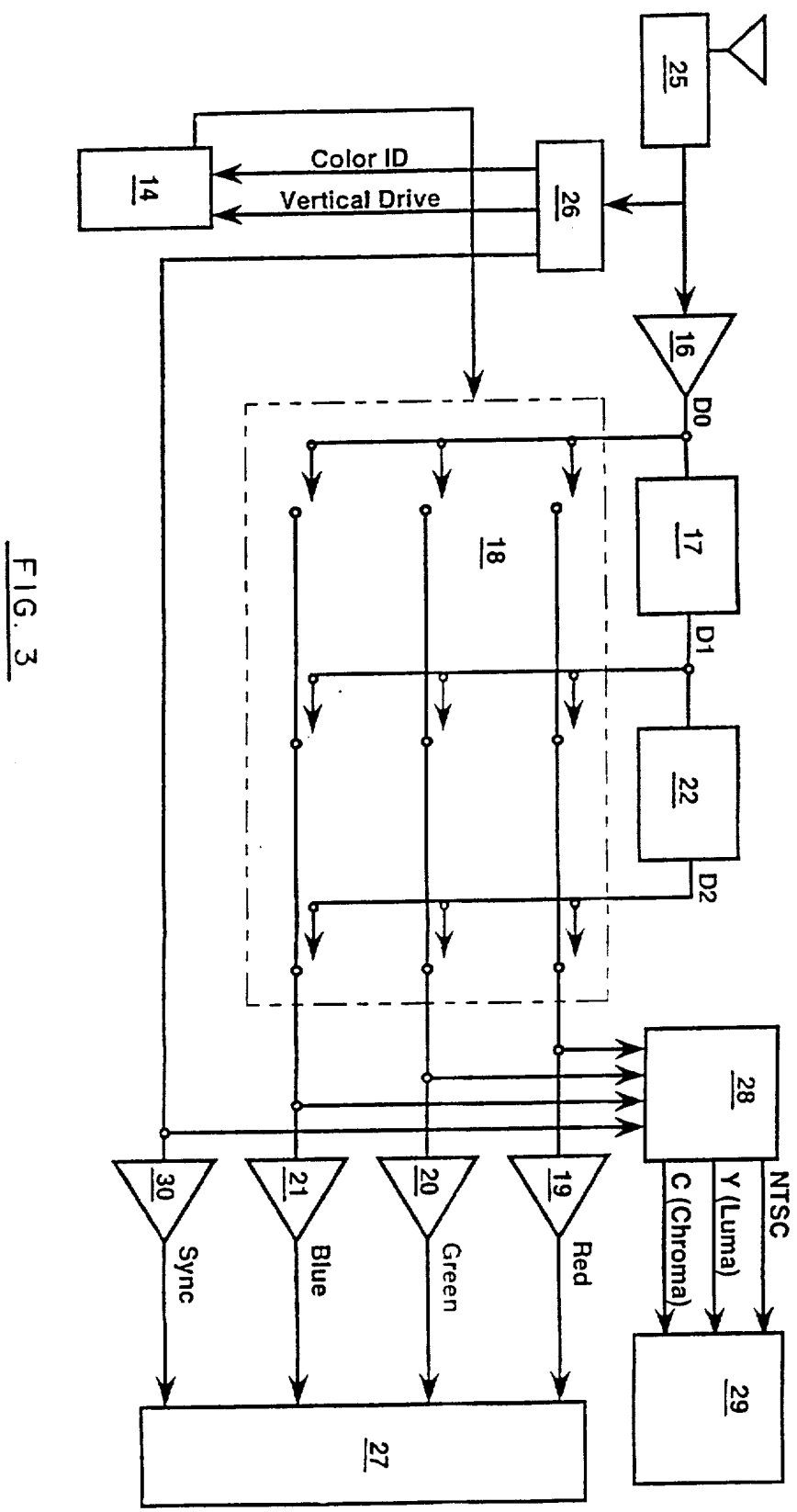
Figure 5:
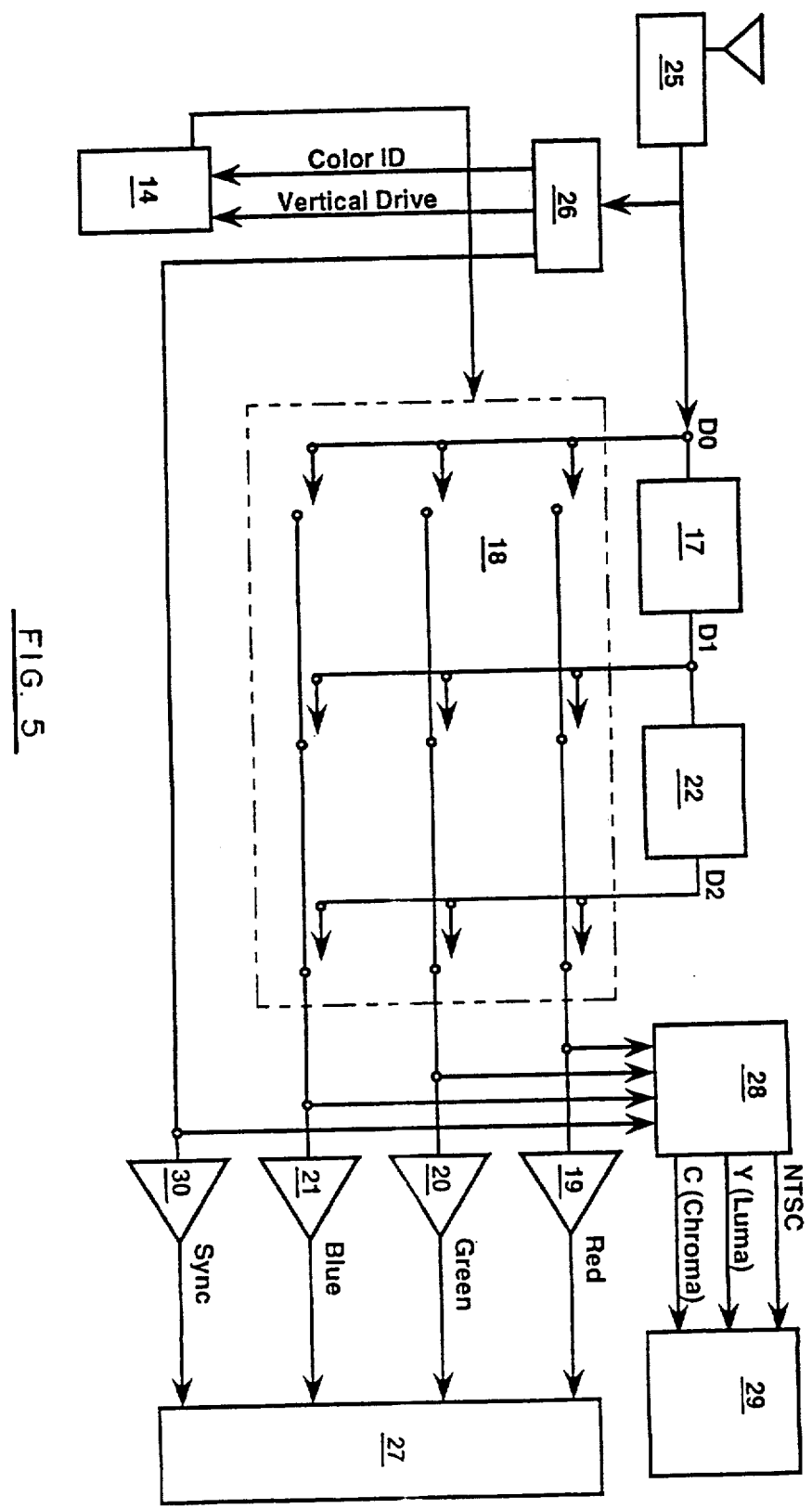

As shown on FIG. 6, at the end of the first field period the vertical drive signal makes a transition and thereby selects the second output of the ring counter 14, resulting in the deactivation of the first light source 11 and the activation of the second primary light source 12, a green LED for example, for one field period. During this second field period, analog data measuring the response of sensor 15 to first light source 11 is captured by analog-to-digital (A/D) converter 16 while integration of the second signal (from second light source 12) is occurring in sensor 15. The output from A/D 16 is provided both to a first digital delay unit 17 and a matrix switch 18. The first delay 17 delays the digitized signal for a time period equal to one field period.

The output signals of ring counter 14 are timed and synchronized such that matrix switch 18 connects the output of A/D 16 (reference D0 on FIG. 6) to first digital-to-analog converter (DAC) 19. First DAC 19 converts the first captured and digitized primary color signal corresponding to the first primary color, from first light source 11, back to analog form, to be used as the odd field video data of the first primary color signal, red for example.

Following the second field period, the object is illuminated by a third primary color light source 13, a blue LED for example, for a third period of time equal to a field period. This is accomplished by the vertical drive signal from the sensor 15 in making a transition, thereby deactivating second light source 12 and activating third light source 13. During this third field period, the third primary color light reflected from the object is focused onto sensor 15. Simultaneously with integration of the third primary color signal in sensor 15, the analog video signal corresponding to the level of reflected second primary color light is captured and digitized by A/D 16. At the beginning of this third field period, the outputs of the ring counter 14 are in such a state as to connect the output from the A/D 16 (D0) to a second DAC 20, and the output from first delay 17 (D1 on FIG. 6) to first DAC 19. Thus, response of the sensor 15 to the first primary color signal, from LED 11, is again presented at the output of first DAC 19 for the even field period of the first primary color. The output of second DAC 20 is the analog video signal corresponding, to the second primary color from LED 12, green for example.

Following the third field period, the object is again illuminated with first primary color light source 11 for a fourth period of time equal to a standard field period. This is accomplished by the vertical drive signal of sensor 15 making a transition which causes third light source 13 to be deactivated and first light source 11 to again be activated. The third color analog signal is captured from sensor 15 and digitized by the A/D 16 during this fourth field period, while the first color light signal is again being integrated.

The second color captured and digitized signal is delayed by first delay 17 and the first color digitized signal is further delayed by one field period by a second delay unit 22. At the beginning of the fourth field period, the outputs of ring counter 14 are such that A/D 16 output (D0) is connected to a third DAC 21, the output of the first delay 17 (D1) is connected to second DAC 20, and the output of second delay 22 (D2 on FIG. 6) is connected to first DAC 19. Also during this fourth field period, the second color digital signal is reconverted to analog format by second DAC 20 and becomes tile odd field of the second color signal, as shown on FIG. 6. Likewise the captured digitized third primary signal (not delayed) is reconverted to analog format by third DAC 21 and becomes the odd field of the third color video signal.

The process continues, in the manner previously described, according to the timing shown in FIG. 6, with repeated successive second, third, and fourth illumination periods. It will be apparent to those skilled in the art that the first field or illumination period is operationally identical to the seventh field period, except that the first illumination period begins with sensor 15 and related devices in a starting or "0-state" condition. In FIG. 6 is shown the relationship among the drive signals to light sources 11, 12, and 13, the outputs of A/D 16 (D0), delay 17 (D1) and delay 22 (D2), and the even-/odd fields of the generated RGB video field. It should be noted that if precise field period analog delay lines were available it would not be necessary to digitize the output of sensor 15 and then reconvert it to analog format. Rather, the sequential analog signals could be merely switched by matrix switch 18 to their respective color signal outputs.

The output signals from DAC's 19, 20, and 21, after processing in the manner described, now correspond to standard video signals capable of display by a conventional RGB color television monitor 27 in conjunction with a standard television synchronization signal obtainable from sensor 15, through driver-amplifier 30. Accordingly, in the preferred embodiment, the resulting video image will comprise conventional odd and even frames or fields of data comprising typically 262.5 horizontal lines each which are interlaced and displayed for one standard field period (1/60 second) each, producing a completed television video image of 525 horizontal lines. As an alternative to using an RGB monitor, the digitized primary color signals and sync signal can be sent to the inputs of a standard NTSC format modulator/encoder unit 28, for display on a standard NTSC format television receiver 29.

Figure 2:
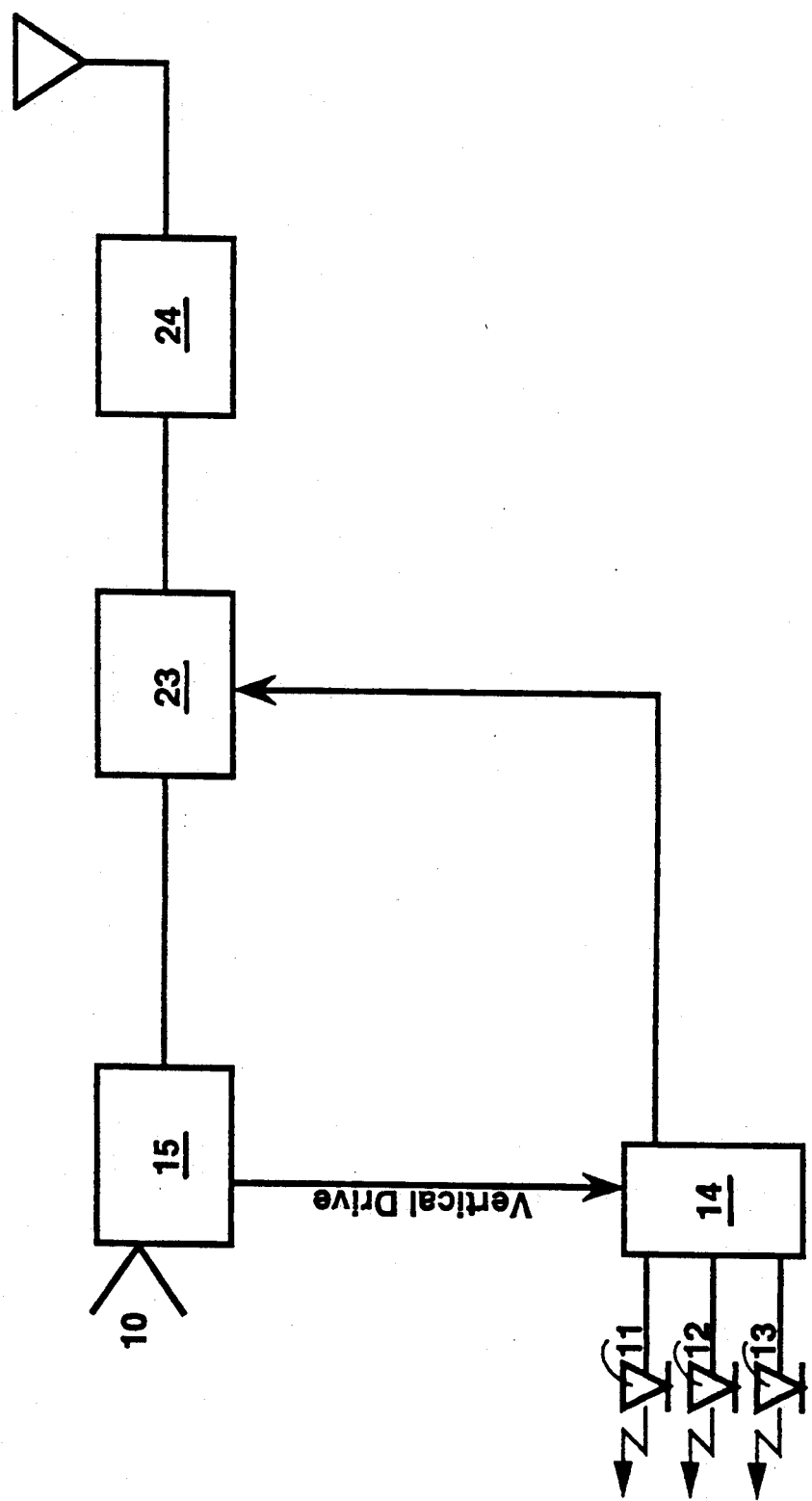
FIG. 2 is a block diagram of the video head-transmitter unit of a second embodiment of the present invention, in which analog video data is transmitted to a remotely located receiver-processor unit.
Figure 3:
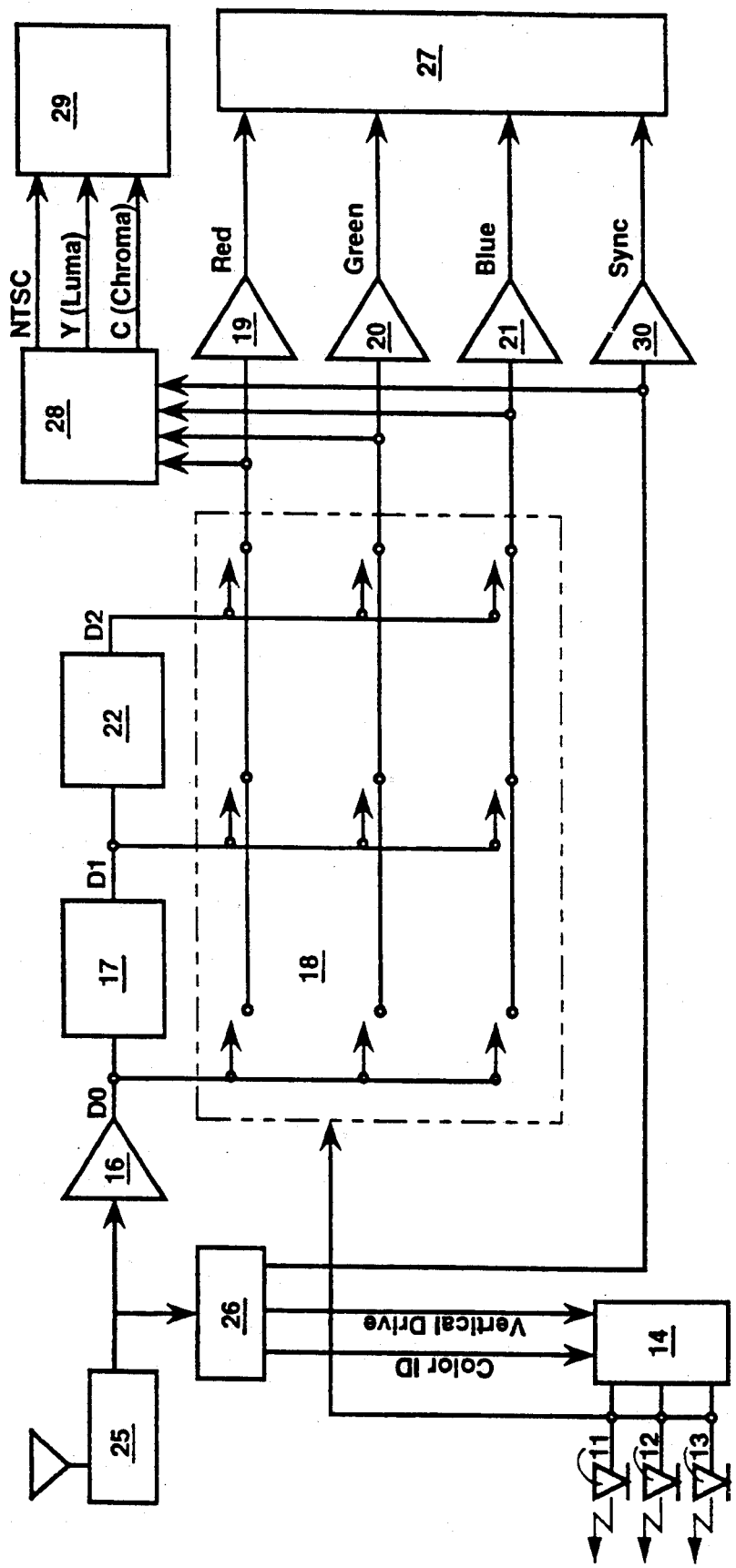
FIG. 3 is a block diagram of the receiver-processor unit of the second embodiment of the present invention.

Referring to FIGS. 2 and 3, a second embodiment of the apparatus of the present invention is shown in which a separate light source/sensor unit (FIG. 2) includes a transmitter for sending analog color level signals to a remote receiver-processor unit (FIG. 3). In this embodiment, data from sensor 15 is tagged with a color identifier signal from ring counter 14 by means of a conventional add color ID circuit 23, which tags the video signal with an identifying pulse denoting which primary color is then represented by the video signal. The output of the add ID circuit 23 is then coupled to a wireless transmitter 24 (also of conventional design) from which it is transmitted to a remote site. Add ID circuit 23 and transmitter 24 can be incorporated in the device either prior to or after A/D 16. In the former case the transmission is of analog video data and in the latter case digital data is transmitted. A conventional color sync signal is also transmitted from sync driver-amplifier 30.

Referring now to FIG. 3, the transmitted data is then received by conventional wireless receiver 25. A conventional sync separator circuit 26 strips off the television synchronization signal, the vertical drive signal, and the color ID signal. The latter two signals control ring counter 14 for selecting the appropriate connections to DAC units 19, 20, and 21. Otherwise the method is identical to that described with reference to the first embodiment of FIG. 1.

Figure 4:
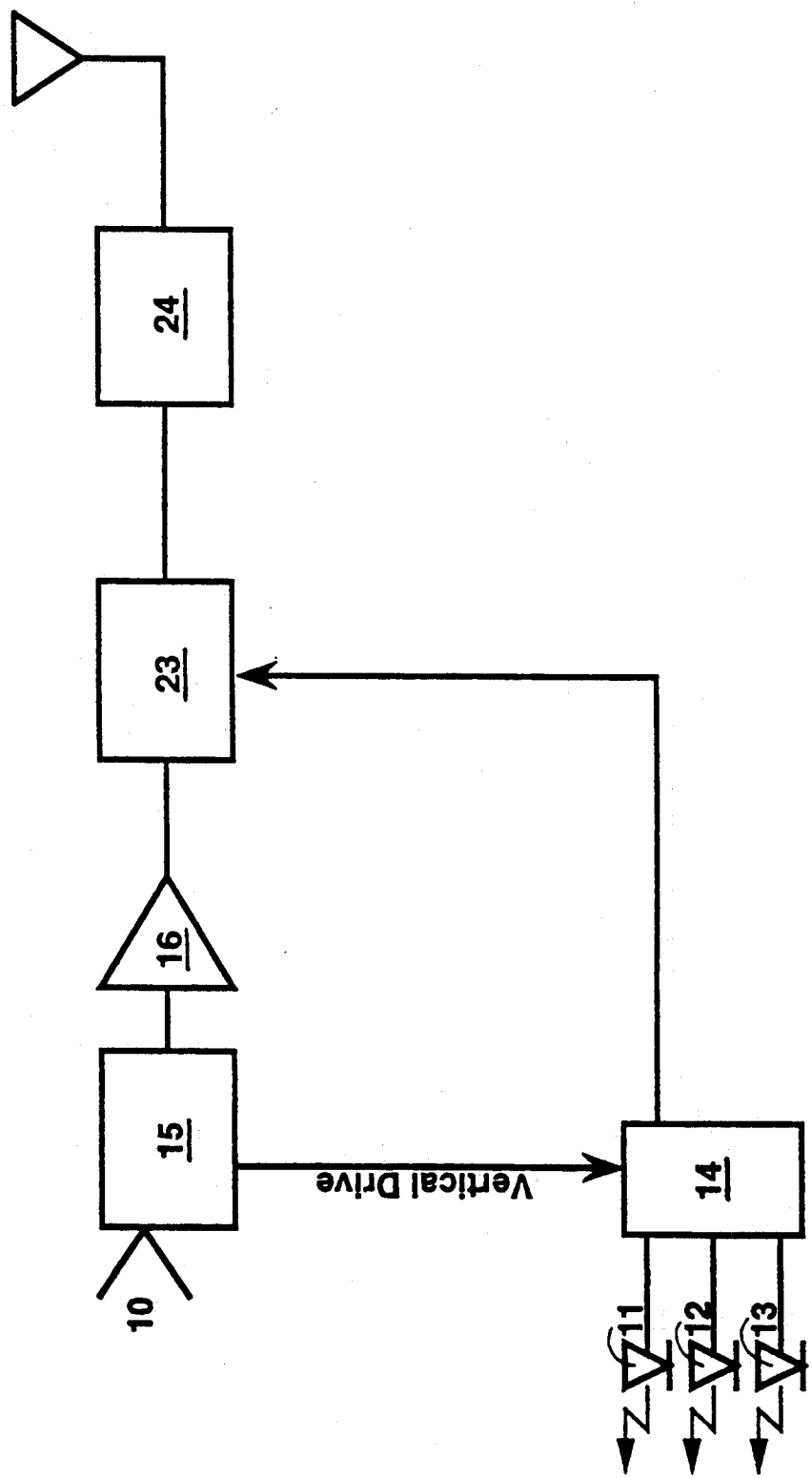
FIG. 4 is a block diagram of the video head-transmitter unit of a third embodiment of the present invention in which data is digitized and transmitted to a remote receiver-processor unit.
Figure 5:
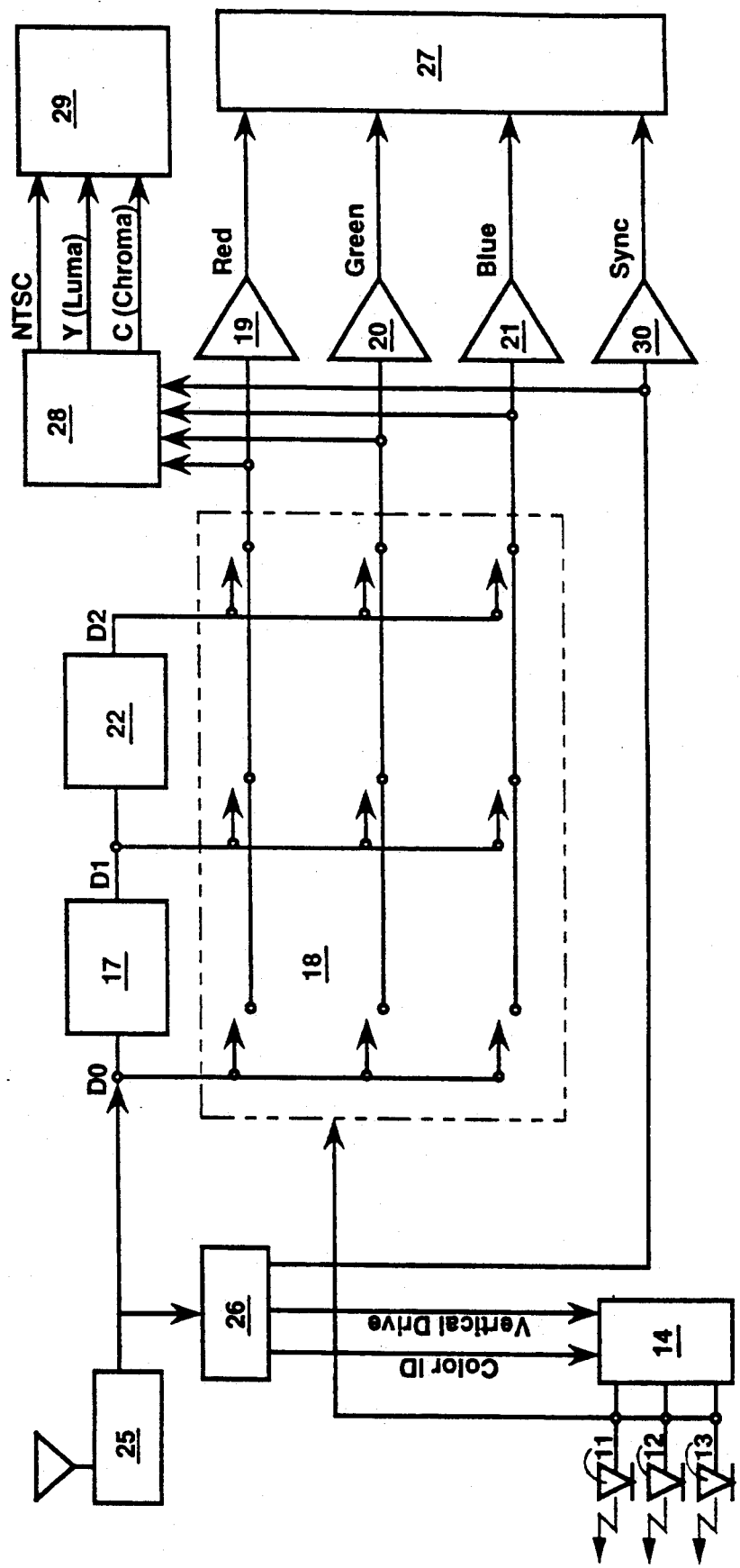
FIG. 5 is a block diagram of the receiver-processor unit of the third embodiment of the present invention.

FIGS. 4 and 5 show yet a third embodiment of the present invention in which the apparatus of FIGS. 2 and 3 is modified by relocation of A/D 16 such that transmission of digital rather than analog data occurs between the transmitter and receiver units.

Although a variety of conventional electronic components and sub-systems can be readily adapted for use in the present invention, in one embodiment A/D 16 is a Brooktree BT/208, delay units 17 and 22 are type NEC 42270, DAC units 19, 20, and 21 are each a Brooktree BT106, counter 14 is a National Semiconductor Model CD 4022, and driver-amplifier 30 is an EL2020 from Elantec. Matrix switch 18 is a tristate buffer type 74HCT244 from Texas Instruments. Of course, it will be appreciated by those skilled in the art that the resolution and sensitivity of the apparatus and method of the present invention are a function in part of the resolution of the A/D and DAC units, tile output levels from light sources 11, 12, and 13, and the sensitivity of sensor 15.

It should be noted that a conventional CCD, as used in the present invention, is an integrating device, meaning that its output is not only a function of the intensity of the light it receives, but such output will continue to increase for as long as the light source remains on. Consequently, depending on the sensitivity needed, and the available intensity of the light sources, it is possible and, in some cases preferable, to activate the primary light sources of the present invention for less than a complete standard field period. From a timing point of view in the present invention, it is only necessary that one primary light source be activated during each standard field period, for a period of time equal to or less than such period. Thus, references herein to an "illumination period" are intended to refer to the fixed period of time during which a light source will be activated, and not necessarily the duration of illumination.

Thus, although there have been described particular embodiments of the present invention of a new and useful Color Video Processing Method and Apparatus, it is not intended that such references be construed as limitations upon the scope of this invention except as set forth in the following claims. Further, although there have been described certain components used in the preferred embodiment, it is not intended that such references be construed as limitations upon the scope of this invention except as set forth in the following claims.

What is claimed is:

1. A method of processing color video images in a single sensor camera system using sequential illumination of an object by first, second and third primary color light sources, said method comprising the steps of:

a. illuminating said object with light from said first primary color light source during a first illumination period equal to a standard television field period;

b. illuminating said object with light from said secondary primary color light source during a second illumination period equal to a standard television field period;

c. illuminating said object with light from said third primary color light source during a third illumination period equal to a standard television field period;

d. illuminating said object with light from said first primary color light source during a fourth illumination period equal to a standard television field period;

e. focusing onto said sensor light reflected by said object during said first and during repeating sequences of said second, third, and fourth illumination periods;

f. during said second illumination period, capturing from said sensor an analog signal corresponding to the level of a first primary color light focused on said sensor during said first illumination period, thereby providing a first primary color captured signal;

g. digitizing said first primary color captured signal, thereby providing a digitized first primary color captured signal;

h. switching said digitized first primary color captured signal to the input of a first primary color digital-to-analog converter and converting said digitized first primary color captured signal back to analog form, thereby providing an odd field reconverted first primary color signal;

i. using said odd field reconverted first primary color signal to represent an odd field television video signal of a first primary color;

j. during said third illumination period, capturing from said sensor an analog signal corresponding to the level of a second primary color light focused on said sensor during said second illumination period, thereby providing a second primary color captured signal;

k. digitizing said second primary color captured signal, thereby providing a digitized second primary color captured signal;

l. switching said digitized second primary color captured signal to the input of a second primary color digital-to-analog converter and converting said digitized second primary color captured signal back to analog from, thereby providing an even field reconverted second primary color signal;

m. using said even field reconverted second primary color signal to represent an even field television video signal of a second primary color;

n. during said third illumination period, delaying in a first delay unit said digitized first primary color captured signal by a time equal to said standard television field period, thereby providing a delayed digitized first primary color signal, and directing said delayed digitized first primary color signal to said first primary digital-to-analog converter, and reconverting said delayed digitized first primary color signal back to analog form, thereby providing an even field reconverted first primary color signal;

o. using said even field reconverted first primary color signal to represent an even field television video signal of said first primary color;

p. during said fourth illumination period, capturing from said sensor an analog video signal corresponding to the level of a third primary color light focused on said sensor during said third illumination period, thereby providing a third primary color captured signal;

q. digitizing said third primary color captured signal, thereby providing a digitized third primary color captured signal;

r. switching said digitized third primary color captured signal to the input of a third primary color digital-to-analog converter and converting said digitized third primary color captured signal back to analog form, thereby providing an odd field reconverted third primary color signal;

s. using said odd field reconverted third primary color signal to represent an odd field television video signal of a third primary color;

t. during said fourth illumination period, delaying in a second delay unit said delayed digitized first primary color signal by a time equal to said standard television field period, thereby providing a further delayed digitized first primary color signal, directing said further delayed digitized first primary color signal to said first primary color digital-to-analog converter, and reconverting said further delayed digitized first primary color signal back to analog form, thereby providing another odd field reconverted first primary color signal;

u. using said other odd field reconverted first primary color signal to represent an odd field television video signal of said first primary color;

v. during said fourth illumination period, delaying in said first delay unit said digitized second primary color captured signal by a time equal to said standard television field period, thereby providing a delayed digitized second primary color signal, directing said delayed digitized second primary color signal to said second primary color digital-to-analog converter, and re-converting said delayed digitized second primary color signal back to analog form, thereby providing an odd field reconverted second primary color signal; and w. using said odd field reconverted second primary color signal to represent an odd field television video signal of said second primary color.

2. The method of claim 1 further comprising the step of transmitting said odd and even field television video signals of said first, second, and third primary colors to a color video monitor.

3. The method of claim 1 further comprising the steps of transmitting said odd and even field television video signals of said first, second, and third primary colors to the inputs of a television signal modulator, and transmitting corresponding composite luminance and chrominance signals from said modulator for display on a television receiver means.

4. The method of either of claims 1, 2, or 3, further comprising the steps of:

a. adding to each of said first, second, and third primary color captured signals a color identification signal that identifies which of said first, second, or third primary colors corresponds to said each of said first, second, and third primary color captured signals thereby providing first, second, and third combined primary color and color identification signals;

b. transmitting said first, second, and third combined primary color and color identification signals to a remote receiver for further processing.

5. A video imaging system comprising:

a. means for sequentially illuminating an object, said illuminating means including at least first, second, and third primary color light sources and means for separately and successively activating said light sources for equal standard television field periods;

b. means for focusing a primary color light reflected from said object onto a sensor, said sensor providing a primary color level analog data responsive to the level of said primary color light focused onto said sensor;

c. means for capturing said primary color level analog data from said sensor;

d. A/D converter means for converting said captured primary color level analog data to digital format, thereby providing digitized captured primary color level data;

e. first delay means coupled to the output of said A/D converter means for delaying for a standard television field period said digitized captured primary color level data;

f. second delay means coupled to the output of said first delay means for further delaying for a standard television field period said digitized captured primary color level data;

g. first, second, and third digital-to-analog converter means for converting said digitized captured primary color level data from said A/D converter means, from said first delay means, and from said second delay means, thereby providing re-converted first, second and third primary color level analog data, said re-converted first, second and third primary color level analog data representing color television video signals corresponding to first, second, and third primary colors; and h. means for successively switching the outputs of said A/D converter means, said first delay means, and said second delay means to said first, second, and third digital-to-analog converter means.

6. The apparatus of claim 5 further comprising television monitor means operatively connected to the outputs of said first, second, and third digital-to-analog converter means.

7. The apparatus of claim 5, further comprising means for wireless transmission of said primary color level analog data from said sensor to a remote location.

* * * * *

UNITED STATES PATENT AND TRADEMARK OFFICE
CERTIFICATE OF CORRECTION

PATENT NO. : 5,264,925

DATED : November 23, 1993

INVENTOR(S) : John I. Shipp, et. al.

It is certified that error appears in the above-indentified patent and that said Letters Patent is hereby corrected as shown below:

Figs. 3 and 5 should be deleted to be replaced with Figs 3 and 5 shown on the attached sheet.

Signed and Sealed this

Eleventh Day of October, 1994

*Attest:*

BRUCE LEHMAN

*Attesting Officer*  *Commissioner of Patents and Trademarks*